2,860,058

PRODUCTION OF SEMI-CERAMIC MATERIALS

Cyril Aubrey Redfarn, London, England, assignor to Walker Extract and Chemical Company Limited, Bolton, England, a British company No Drawing. Application July 11, 1955
Serial No. 521,407

Claims priority, application Great Britain July 14, 1954

10 Claims. (Cl. 106—39)

This invention is for improvement in or relating to the production of heat-resistant materials and has for an object to provide a new class of substances having a high heat-stability and which are easily mouldable and capable of being set at temperatures appreciably below those customary in the production of normal ceramic materials.

It is well known that, in the manufacture of ceramics, mixtures of oxides and/or silicates are heated at temperatures of 900° C. and upwards to effect a part-fusion of the oxides and silicates.

It has now been found that the inorganic polymeric compounds of the formula $(PNCl_2)_n$ react chemically with a number of silicate materials. The polyphosphochloronitrides, hereinafter referred to as polyphosphonitrilic chlorides in accordance with currently used terminology, have been described in "Structural Chemistry of Inorganic Compounds," by W. Hückel, 1951, volume 11, chapter IX, part 2, section 6, which describes various investigations on the products obtained by the reaction of ammonium chloride with phosphorus ponta-chloride. The polyphosphonitrilic chlorides range from soft crystals through liquids to rubber-like and hard polymers, the crystals being polymers where $n$ equals 3 or 4 whilst the liquid products are those where $n$ is 5, 6 or more.

"Mixed polyphosphonitrilic chlorides" means a mixture of polyphosphonitrilic chlorides prepared according to the method of R. Schenck and G. Romer (Borichto, vol. 57, p. 1343 (1924)). The tri-phosphonitrilic chloride and tetraphosphonitrilic chloride were prepared by extracting the mixture of polyphosphonitrilic chlorides prepared in this way with light petrol boiling between 40° C. and 60° C. The extract, from which the solvent had been removed by evaporation, was filtered. The residue, consisting of crystalline triphosphonitrilic chloride and tetraphosphonitrilic chloride together with a little oil, was subjected to fractional distillation at a pressure of 13 mm. mercury. The triphosphonitrilic chloride was collected as a fraction boiling at 127° C., and the tretraphosphonitrilic chloride as a fraction boiling at 188° C.

The invention is based on the discovery that the polyphosphonitrilic chlorides react, as hereinafter described with mineral substances and throughout this specification the expression "low molecular weight polyphosphonitrilic chlorides" is used to mean the soft crystals or liquid polymers and the expression "mineral substance" is used herein to mean a naturally-occurring calcium or magnesium silicate such as asbestos, chrysotile and mica.

According to the present invention there is provided a process for the production of semi-ceramic materials which comprises heating a polyphosphonitrilic chloride, preferably of low molecular weight, with a mineral substance (as hereinbefore defined) in the form of discrete particles or fibres at a temperature of at least 300° C. to effect reaction therebetween; preferably, the oily polymer is employed as it is more readily mixed with the fibrous or powdery mineral substance.

Since the chlorides of calcium and magnesium are hygroscopic and water-soluble it is preferred to include in the reaction mixture a substance which will undergo double decomposition with the calcium and magnesium chlorides to produce an insoluble chloride and it has been found that litharge, the yellow oxide of lead, is a particularly suitable compound for this purpose.

A wide variety of fillers may be added to the reaction mixture; such fillers are preferably those substances which are inert, or which have a low order of reactivity, towards the polyphosphonitrilic chlorides and include compounds such as alumina, carborundum, titanium, carbide and silica as well as graphite.

Since there are various mineral substances which are available in the form of sheets or webs, it is possible, by my invention, to form laminated products in which sheets or webs of felted, woven or knitted, fibres, filaments, threads or yarns of a mineral substance are impregnated with the oily polyphosphonitrilic chloride and heat-cured by heating at temperatures of 300° C. and above; in the production of laminated products two or more plies of the sheeted mineral substance are bonded together.

The lower molecular weight polymers, i. e. the crystalline substances where $n$ equals 3 or 4 in the general formula given above, are smoothly convertible on heating into the higher polymers and consequently it is possible to carry out the present invention utilising these crystalline polymers which on heating, are smoothly converted into the oily polymers and, on further heating, react with the mineral substance with which they are admixed.

In carrying the invention into effect, it is preferred to admix the polyphosphonitrilic chlorides, particularly the oily polymers, with the mineral substance or a mixture of mineral substances in an amount such that the mixture contains only a minor proportion of the polymer, amounts of 20 to 30% of the composition being suitable. The admixture of the polymer with a mineral substance, such as asbestos, chrysotile and mica powder is shaped in a mould of the type used for the compression moulding of plastic materials and, by heating at a temperature of 175° C. in such a mould under a pressure of the order of 1 ton per square inch for a period of 1 hour, a preliminary setting of the mix is effected whereafter the final conversion of the mix into a semi-ceramic material may be effected by heating the material in the mould in an oven at 300° C. for 1 hour. Alternatively, the two-stage heating may be avoided and the material subjected initially to a temperature of 300° C. or higher whilst in the initial mould under pressure. A further alternative is that, after the preliminary heat treatment, the moulding may be removed from the mould and cured in an oven at a temperature of 300 to 350° C. for an appropriate period of time, for example 2 to 3 hours.

In preparing the mix, it is an advantage to use a mixture of mineral substances of graded sizes so as to form a dense final product, i. e. so as to avoid an undue proportion of interstices.

A number of experiments were carried out to ascertain the situation relating to the reaction between polyphosphonitrilic chlorides and asbestos as a typical and preferred mineral substance.

In carrying out these tests the asbestos in the form of flock was mixed with the oily polymer in various proportions, in each case an amount of litharge amounting to 10% by weight of the oily polymer being included.

The various mixtures were all placed in a 2-inch diameter positive mould and pressed under high pressure and subjected to various temperatures, both during the moulding operation and after-curing treatment (carried out in the mound but no longer under pressure).

A standard mix and standard conditions were adopted with a view to providing a basis on which comparisons could be made, and in the following descriptions, the parts quoted are by weight.

The standard mix consisted of 20 parts of the oily polyphosphonitrile chloride and 100 parts of asbestos. This mix was placed in a 2-inch diameter positive mould and was moulded under a pressure of 17 tons per square inch. The temperature during the moulding operation was 180° C. and the material was maintained in the mould for 15 minutes at this temperature. Thereafter, the mould was removed from the press and was placed in an oven maintained at a temperature of 360° C. where it was allowed to remain for 60 minutes. The cured disc was then placed in a testing device consisting of a plate having an ½-inch diameter cavity and a pointed member which was brought into contact with the free surface of the disc and the pressure noted at which penetration of the disc took place. The standard disc having a thickness of approximately 0.375 inch broke at an applied pressure of .95 tons which gave a strength factor $\left(\text{Calculated from the formula of }\frac{\text{thickness}}{\text{strength}} \times 100\right)$ of 250

The following table shows the strength factor obtained with differing proportions of the polyphosphonitrilic chloride to asbestos.

Table I

| Experiment No. | Oil in Parts | Asbestos in Parts | Thickness in inches | Breaking Strength in tons | Strength |
|---|---|---|---|---|---|
| 1 | 20 | 80 | 0.357 | 0.85 | 238 |
| 2 | 15 | 100 | 0.375 | 0.84 | 227 |
| 3 | 10 | 100 | 0.385 | 0.88 | 226 |

Further tests were carried out to establish the necessity for an after-cure treatment in which, in each instance, the above-mentioned standard mix was employed, the temperature during moulding being 200° C. and no after-cure being employed. The time of heating in the mould was varied as shown in the following table which illustrates the fact that even at the long heating period of 2 hours the strength factor was far below that obtainable when an after-cure was used.

Table II

| Experiment No. | Time | Thickness in inches | Breaking Strength in tons | Strength Factor |
|---|---|---|---|---|
| 1 | 30 | 0.350 | 0.14 | 40 |
| 2 | 45 | 0.335 | 0.21 | 63 |
| 3 | 60 | 0.350 | 0.40 | 140 |
| 4 | 90 | 0.365 | 0.50 | 137 |
| 5 | 120 | 0.350 | 0.45 | 129 |

A further series of tests in which the time in the mould was kept constant but the temperature was varied and in which no after-cure was used was also carried out, the standard mix as above referred to again being used. The results are set out in the following table.

Table III

| Experiment No. | Temp., ° C. | Thickness in inches | Breaking Strength in tons | Strength Factor |
|---|---|---|---|---|
| 1 | 120 | .175 | 0.075 | 43 |
| 2 | 150 | .180 | 0.14 | 78 |
| 3 | 200 | .185 | 0.175 | 95 |
| 4 | 290 | .190 | 0.26 | 137 |

A yet further series of tests was carried out in which the proportion of polymer to asbestos was varied, the test in each case involving the heating of the various mixes in an oven at 320° C. for 60 minutes with the result that it was found, with increasing proportions of the polymer, that the final cured product showed an increasing softness. The ratios of polymer to asbestos were varied from 1:5 to 5:1 and at the lower proportions of polymer showed a hard product which could be crumbled, varying until at the 3:1 ratio the product became rubbery; at a ratio of 2 of polymer to 3 of asbestos the product begins to lose the very hard nature, similar to a ceramic material, characteristic of the lower polymer contents.

Further experiments were carried out using asbestos in different forms with the following results. Asbestos cloth made from grey asbestos was saturated with the oily polyphosphochloronitride so that it absorbed 30% of its weight of polymer; curing for 60 minutes at 300° C. gave a hard, somewhat flexible product. When the content of the oily polymer was increased to 100% by weight of the asbestos cloth and the product was heated for 30 minutes at 200° C. followed by 60 minutes at 300° C. there was obtained a hard product which was somewhat fragile.

When the last experiment was repeated, substituting an asbestos cloth made from Cope blue asbestos, the product was a hard flexible product exhibiting elastic recovery.

A further experiment was carried out using asbestos millboard which was impregnated with the oily polymer taking up 25% of its weight thereof. Heating for 30 minutes at 200° C. gave no appreciable increase in strength to the millboard but on after-curing for 30 minutes at 300° C. a 65% increase in hardness was obtained.

A laminated product was prepared by superimposing four pieces of asbestos cloth each impregnated with 30% of the oily polymer. The superimposed sheets were laminated by pressing in a press under a pressure of 17 tons per square inch and heated at 200° C. for 30 minutes; at this stage the laminae were firmly bonded together and an after-cure for 30 minutes at 300° C. yielded a hard, rigid product which strongly resisted delamination.

When Madagascar mica powder was substituted for the asbestos flock in the above-mentioned standard mix and moulded under 17 tons per square inch pressure at 200° C. for 30 minutes followed by after-curing in the oven at 300° C. for 30 minutes, a clean hard molding resulted having a strength factor, as above referred to, of 130; slate powder, which is similar in chemical constitution to the mica, when used as described above for mica, yielded a hard product which, however, had a comparatively poor strength factor. When slate powder was used as a filler to replace part of the asbestos flock in the above-mentioned standard mix, satisfactory mouldings were obtained whose strength factor, however, was considerably reduced (to a value of about 70) at a slate content of 10%, the strength factor falling off as the amount of slate powder was increased.

It was established by experiment that when the moulded mixes which had been heated at temperatures below 300° C. were extracted with xylene, considerable proportions (amounting to at least half) of the polymer could be extracted from the moulding, whereas when the moulds had been after-cured no appreciable extract of unreacted polymer could be obtained.

It may be observed that the standard mix is very stable and after storage for a period of eight weeks could be moulded to give a product apparently exactly equivalent to the standard product having a strength factor of 250 as above referred to.

The following example will illustrate the way in which the invention may be carried into effect:

70 parts by weight of asbestos fibre are mixed with 30 parts by weight of the oily polyphosphochloronitride and they are mixed in the cold in a Bridge Banbury mixer.

The thoroughly intermixed ingredients are then placed in a mould in which they are heated under a pressure of 1 ton per square inch at a temperature of 175° C. for 1 hour. The mould is then placed in a furnace and stoved at a temperature of 300 to 350° C. for 3 hours.

The mould may be either a positive or semi-positive mould and the foregoing example may be modified by substituting the soft crystalline polymer for the oily polymer without substantial departure from the other details of the example.

The product of the invention, particularly when in the form of laminated asbestos cloth, felt or paper may be used as heat-resistant gaskets and generally the products of the present invention are very thermo-stable and will withstand temperatures as high as 500° or even 600° C. which makes them suitable for use as high temperature heat and electrical insulating materials, bearing, abrasive elements, frictional elements, jointings and packings.

It will be appreciated that the final product will depend, in some measure, upon the physical characteristics of the mineral substance employed which may, as already indicated, be either in the form of powder or fibres and the fibres may be in the form of a felted, woven or knitted sheet or web.

I claim:

1. A process for the production of heat-resistant materials which comprises heating an admixture of a polyphosphonitrilic chloride with a naturally-occurring silicate of the class consisting of the calcium and magnesium silicates in discrete form for about half-an-hour to about three hours at a temperature in the range of about 300° C. to about 350° C. in the proportions of from about 1:5 to about 5:1, thereby effecting substantial chemical combination of said polyphosphonitrilic chloride with said silicate.

2. A process according to claim 1 wherein the oily polyphosphonitrilic chloride is employed.

3. A process according to claim 1 wherein said admixture is heated in a mould under pressure.

4. A process according to claim 1 wherein said admixture is heated in a mould under pressure for about 15 minutes to about 60 minutes at a temperature in the range of about 175° C. to below 300° C. to effect polymerisation of said polyphosphonitrilic chloride and the moulded product is thereafter heated to about 300° C. to about 350° C. to effect said chemical combination.

5. A process according to claim 1 wherein said admixture also contains litharge to react with the alkaline earth metal chloride resulting from said chemical combination.

6. A process according to claim 1 wherein said admixture also contains a filler which is substantially inert towards said polyphosphonitrilic chloride.

7. A process according to claim 1 wherein the polyphosphonitrilic chloride is employed in an amount of from 20% to 30% by weight of the composition.

8. A process according to claim 1 wherein said naturally-occurring silicate is asbestos.

9. A process according to claim 1 wherein said naturally-occurring silicate is in the form of a fabric web.

10. A process according to claim 9 wherein a plurality of plies of said fabric web are superimposed and heated to form a laminated product.

References Cited in the file of this patent
UNITED STATES PATENTS
2,334,710    Kauth _____ Nov. 23, 1943